United States Patent
Chang et al.

[11] 3,985,708
[45] Oct. 12, 1976

[54] POLYMERIC REACTION PRODUCTS OF THIODIETHANOL AND DIPHENOLS

[75] Inventors: Eugene Yue Chieh Chang, Somerset County; Robert Saxon, Mercer County, both of N.J.

[73] Assignee: American Cyanamid Company, Stamford, Conn.

[22] Filed: Sept. 18, 1974

[21] Appl. No.: 507,025

[52] U.S. Cl. .............................. 260/47 R; 260/79.7; 260/79
[51] Int. Cl.² .................. C08G 75/02; C08G 75/12
[58] Field of Search .................... 260/47 R, 79, 79.7

[56] References Cited
UNITED STATES PATENTS
2,998,413    8/1961    Holtschmidt et al. ......... 260/2.5 AP FOREIGN PATENTS OR APPLICATIONS
683,154    11/1964    Canada
682,671    3/1964     Canada OTHER PUBLICATIONS
Andrews, et al. Journal of Polymer Science vol. XLI, pp. 231–239.

*Primary Examiner*—Joseph L. Schofer
*Assistant Examiner*—Peter F. Kulkosky
*Attorney, Agent, or Firm*—Charles J. Fickey

[57] ABSTRACT

A vulcanizable elastomer composition is provided which comprises a copolymer represented by the formula:

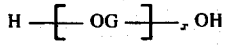

wherein 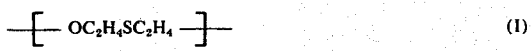 comprises randomly alternating structural units (I), (II), and optionally, (III)

—[— $OC_2H_4SC_2H_4$ —]—    (I)

—[— OR —]—    (II)

—[— OR' —]—    (III)

wherein R represents the residue remaining on removal of two phenolic hydroxyl groups from a diphenolic compound and R' represents the residue remaining on removal of two hydroxyl groups from an aliphatic diol; said copolymer characterized in that the ratio of structural units (I) to structural units (II), or optionally, to the total of structural units (II) and (III), is not less than 1:1, and further characterized in that up to about 10 mole percent, based on total number of structural units [OG] of structural units (III), when present in said copolymer, contain external unsaturation having an allylic hydron atom; and $x$ is an integer sufficient to provide a molecular weight of at least about 8000.

12 Claims, No Drawings

POLYMERIC REACTION PRODUCTS OF THIODIETHANOL AND DIPHENOLS

Generally stated, the subject matter of the present invention relates to novel vulcanizable elastomeric compositions and to the elastomers obtained therefrom. More particularly, the invention relates to elastomers based on copolymers of thiodiethanol with compounds containing two phenolic hydroxyl groups or copolymers of thiodiethanol, one or more aliphatic diols and a compound containing two phenolic hydroxyl groups which exhibit excellent low temperature flexibility, as well as outstanding resistance to hydrocarbon oils.

BACKGROUND OF THE INVENTION

Thiodiethanol is a well known diol, the hydroxyl groups of which exhibit unusual reactivity because of their positioning beta to a sulfur atom in an aliphatic chain. Unlike alkanediols, such as 1,4-butanediol, thiodiethanol quite readily undergoes an autocondensation reaction under the influence of heat and certain acidic dehydrating catalysts, such as hydrogen chloride. This was shown by Ballard et al, U.S. Pat. No. 2,484,369. Low molecular weight, rubberlike materials, indicated as (I) in the following reaction scheme, were obtained:

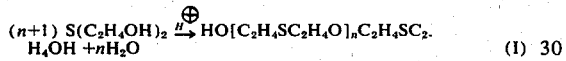

Woodward et al, J. Poly. Sci. 41, 219-23; 225–30 and 231–239 (1959), studied the acid-catalyzed autocondensation of thiodiethanol with hydrochloric acid and phosphorus pentoxide, and copolymerization thereof with aliphatic hydroxy compounds. Hydrochloric acid provided low molecular weight, waxy, water-soluble polymers in addition to ring closure to thioxane. Phosphorus pentoxide afforded products ranging from viscous liquids to rubber waxes. Some indication of copolymerization with diethylene, trimethylene and butylene glycols were found. However, no useful rubbery polymers were observed.

Thiodiethanol has been copolymerized with equimolar amounts of 1,6-hexanediol in the presence of p-toluene sulfonic acid to give low molecular weight waxy polymers (Holtschmidt, U.S. Pat. No. 2,998,413); with triethylene glycol, 1,6-hexanediol and trimethylol propane in the presence of phosphorous acid to give low molecular weight polymers useful as polyurethane intermediates (Holtschmidt, French Pat. No. 1,373,471); with thiodipropionic acid to give hydroxyl terminated low molecular weight polymers suitable for polyurethanes (Holtschmidt, German Pat. No. 1,045,641). These products have been reacted with aromatic diisocyanates to provide polyurethane elastomers; see, for example, U.S. Pat. No. 2,862,962; French Pat. No. 1,373,471; German Pat. Nos. 1,007,502, 1,045,641 and 1,108,903 and British Pat. Nos. 791,854 and 818,359.

However, neither the autocondensation of thiodiethanol, nor co-condensation with aliphatic diols, has resulted in rubbery products which were useful. Moreover, elastomers derived from thiodiethanol, other than the polyurethane elastomers described above, have not been disclosed.

The present invention represents the culmination of a long series of investigations, conducted largely by the inventors, directed to preparing vulcanizable elastomers based on copolymers of thiodiethanol.

Accordingly, it is an object of this invention to provide vulcanizable elastomer compositions based on compolymers of thiodiethanol.

It is therefore a principal object of this invention to provide rubbery polymers of thiodiethanol and compounds containing two phenolic hydroxyl groups, which can be cured or vulcanized by conventional techniques to provide useful elastomeric products exhibiting excellent low temperature flexibility and outstanding resistance to hydrocarbon oils.

It is another object of the invention to provide vulcanizable elastomeric compositions from copolymers of thiodiethanol, one or more aliphatic diols, and a compound containing two phenolic hydroxyl groups; and the elastomeric products obtained therefrom.

An additional object is to provide useful elastomers from such compositions.

A further object of the invention is to provide elastomers which have low temperature flexibility and resistance to hydrocarbon oils.

Additional objects and advantages will be set forth in part in the description which follows and in part will be obvious from the description or may be learned by the practice of the invention, the object and advantages being realized and attained by means of the compositions, processes and improvements, particularly pointed out in the appended claims.

THE INVENTION

To achieve the foregoing objects and in accordance with its purposes as embodied and broadly described, the present invention provides a vulcanizable elastomer composition comprising a copolymer represented by the formula:

wherein $\{$ OG $\}$ consists of randomly alternating structural units (I), (II) and optionally, (III):

 (I)

 (II)

 (III)

wherein R represents the residue remaining on removal of two phenolic hydroxyl groups from a diphenolic compound and R' represents the residue remaining on removal of two hydroxyl groups from an aliphatic diol; said copolymer characterized in that the ratio of structural units (I) to structural units (II), or, optionally, to the total of structural units (II) and (III), is not less than 1:1, and further characterized in that from about 0 to 10 mole percent, based on total number of structural units [OG], of structural units (III), when present in said copolymer, contain external unsaturation having an allylic hydrogen atom; and x is an integer sufficient to provide a molecular weight of at least about 8000.

The present invention is based on the discovery that thiodiethanol will undergo condensation reactions with certain compounds or compositions containing two phenolic hydroxyl groups to provide useful polymeric compositions under the conditions defined hereinbelow, and that high molecular weight, rubbery, vulcanizable elastomeric compositions are obtained therefrom which, when vulcanized by conventional techniques, produce elastomers exhibiting excellent low temperature flexibility and outstanding resistance to hydrocarbon oils.

It is surprising and unexpected that useful polymers are obtained in the manner described, since it is known that conventional aliphatic diols do not undergo similar condensation reactions, at least not under the conditions described herein. Richter et al, J. Am. Chem. Soc. 74, 4076-79 (1959) reported the etherification of thiodiethanol with phenol to give the bisphenyl ether, a low molecular weight, non-polymeric compound. They also reported that similar etherification did not occur with m- or p- nitrophenol.

The term thiodiethanol, as used in this invention, means thiodiethanol, polythiodiethanol, copolyethers of thiodiethanol with aliphatic diols in which the terminal groups are thiodiethanol units, and polyesters of thiodiethanol with dibasic acids, in which the terminal groups are thiodiethanol units.

Any polythiodiethanol may be used in preparing the polymers of this invention. Such polymers are known and are prepared by heating thiodiethanol in vacuo in the presence of acidic catalysts. They may range from low molecular weight liquids to high molecular weight rubbery gums.

Polyethers of thiodiethanol with conventional aliphatic diols may also be used, so long as the polyols obtained are terminated with thiodiethanol units. They are readily prepared in accordance with procedures described in concurrently filed copending patent application of Romeo Raymond Aloia.

Similarly, polyesters of thiodiethanol with dicarboxylic acids, or their derivatives, may be used, provided again that the resulting polyols are terminated with thiodiethanol units. They are prepared using well known techniques for making polyesters, whereby a stoichiometric excess of thiodiethanol is condensed with a carboxylic acid to produce hydroxyl terminated polymers.

As herein employed, the term compound containing two phenolic hydroxyl groups shall be defined to mean (a) bisphenols of the general formula:

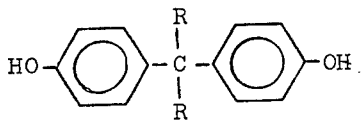

wherein the R's may be the same or different and selected from hydrogen alkyl, or taken together with the carbon atom, combine to form a cycloalkylene bridge; (b) dihydroxy aromatic compounds, such as hydroquinone, resorcinol, naphthalene diols, and the like; (c) polymers of (a) or (b), for example, polyesters of hydroquinone with dibasic acids, or polyethers of a bisphenol with epichlorohydrin, wherein the terminal groups or chain-ends are substantially phenolic residues.

The polymers of the invention are prepared in the presence of an acidic catalyst having a pK of 5 or less. The preferred catalyst is phosphorous acid. Other useful acid catalysts, some of which produce undesirable side reactions such as formation of odoriferous thioxane or dithiane, include hydrochloric and sulfuric acids, sulfamic acid, picric acid, trialkyl phosphites, p-toluenesulfonic acid, phosphoric acid, and the like. Effective catalysis is achieved using from about 0.01 to 3 percent by weight of monomers, preferably 0.1 to 1 percent. More than 3 percent catalyst may be used, but no advantage has been found in employing a higher concentration.

Suitable aliphatic diols which may be used in preparing the copolymers of the invention include those diols normally used in the preparation of polyesters, such as ethylene glycol, propane-1,2- and 1,3-diol, butane-1,4-diol, pentane-1,5-diol, hexane-1,6-diol, diethylene glycol, cyclohexane-1,4-diol, cyclohexane-1,1-,1,2-,1,3- and 1,4-dimethanol, bisethers of dihydroxyaromatic compounds, such as the bis(hydroxyethyl) ether of hydroquinone or resorcinol; monoallyl ether of trimethylolpropane, monoallyl ether of glycerol; 3-cyclohexene-1,1-dimethanol, 3-cyclohexene-1,1-diethanol, cyclobutene-1,1-dimethanol; bicyclic aliphatic diols, such as 5-norbornene-2,2-dimethanol, 5-norbornene-2,3-dimethanol, and the like.

The term external unsaturation as herein employed refers to the position of the unsaturation in the diol molecule such that at least one continuous chain of atoms remains in the diol, extending between the two diol oxygen atoms, which chain does not include any carbon-to-carbon double bonds. Such compounds include, but the invention is not limited to, 3-cyclohexene-1,1-dimethanol, monoallylether of trimethylolpropane, monoallyl ether of glycerol, 5-norbornene-2,2-dimethanol, and the like, all of which contain an allylic hydrogen atom.

The preparation of high molecular weight rubbery gums, so-called "millable gums", by reaction of thiodiethanol or polythiodiethanol with a diphenolic compound is a preferred embodiment of the invention. Such polymers consist of structural units (I) and (II), as defined hereinabove. They do not contain unsaturation, but may be cured to useful elastomeric compositions by reaction with resins, such as melamine-formaldehyde resins. One such cure system uses hexamethoxymethylmelamine.

Particularly preferred embodiments of the invention are sulfur vulcanizable copolymers of thiodiethanol, a diphenolic compound and one or more aliphatic diols, that is copolymers containing structural units (I), (II) and (III), as defined hereinabove. These polymers may be viscous liquids, curable by casting techniques, or rubbery "millable" gums which may be cured by conventional sulfur vulcanization techniques.

Compounds containing two phenolic hydroxyl groups which are preferred in the practice of the invention include the class of bisphenols as hereinabove defined, particularly Bisphenol A (isopropylidenebisphenol), and dihydroxy aromatic compounds, particularly hydroquinone and resorcinol.

The vulcanizable elastomer compositions may be compounded with a variety of compounding ingredients commonly used in rubber, such as pigments and fillers (carbon black, titanium dioxide), antioxidants, sulfur, accelerators, plasticizers, lubricants, cure modifiers, and the like.

The elastomeric products of the invention exhibit excellent low temperature flexibility, that is, they have a low brittle point, as measured by thermomechanical analysis techniques, in the range of −60° to 40° C.

Thermomechanical analyses is conducted using a duPont Thermomechanical Analyzer, Model 990, Module 942. The method basically measures the first transition temperature of a specimen which is warmed from −120° C in contact with a weighted needle-like probe. The transition temperature is determined from the first deflection point on a continuously recording chart. This first transition temperature is analogous to the glass transition temperature (Tg) and is referred to herein as the brittle point.

The elastomers possess outstanding resistance to hydrocarbon oils, that is, they do not appreciably swell, deform or degrade in a hot oil environment. Volume swell is determined by ASTM Test Method D471. ASTM No. 3 oil, as described in that Test Method, is used in the volume swell tests shown in the Examples.

The following examples are provided for illustrative purposes and may include particular features of the invention. However, the examples should not be construed as limiting the invention, many variations of which are possible without departing from the spirit or scope thereof.

EXAMPLE I

A mixture of 967 grams, 8.0 moles, of thiodiethanol, 103 grams, 0.6 mole, of the monoallyl ether of trimethylolpropane, 3 grams antioxidant (1) and 6 grams of phosphorous acid was heated for 4 hours at 190° C under a nitrogen atmosphere and then for 30 minutes at 150° C/25 inches vacuum. The resulting copolymer had a hydroxyl number of 83, equivalent to a molecular weight of 1350.

A portion, 360 grams, of the copolymer, 90 grams of isopropylidenebisphenol and 1.1 grams of phosphorous acid were heated at 190° C/10 min. Hg for 2 hours. About 180 grams of the resulting viscous syrup was transferred to an Atlantic 2CV Reactor (2) and the reaction continued for 12 hours at 165°–170° C to provide a rubbery gum.

100 Grams of the gum was compounded on a 2-roll rubber mill with:

| | | |
|---|---|---|
| FEF Carbon black | 40 | grams |
| Stearic acid | 1 | |
| Calcium carbonate | 4 | |
| Zinc Oxide | 5 | |
| Antioxidant (1) | 0.5 | |
| Sulfur | 3 | |
| Tetramethylthiuram Disulfide | 0.5 | |
| N-Cyclohexyl benzothiazole-2-sulfenamide | 1.5 | |

(1) 4,4'-thiobis(3-methyl-6-tert.butylphenol);Santonox R (Monsanto Co.)
(2) A high shear sigma mixer manufactured by Atlantic Research Co., Gainesville, Va.

The compounded gum was compression molded for 50 minutes at 320° F. The cured elastomer exhibited the following properties:

| | |
|---|---|
| Hardness, Shore A | 70 |
| Modulus at 100%, psi | 900 |
| Tensile, psi | 1400 |
| Elongation, % | 160 |
| Volume Swell, % (ASTM No. 3 oil) | 8.5 |

This example represents a preferred embodiment of the invention.

EXAMPLE II

Thiodiethanol, 540 grams, 3-cyclohexene-1,1-dimethanol, 60 grams, and 3.6 grams of phosphorous acid were reacted in a manner similar to Example I to give a copolymer syrup.

A 400 gram portion of the copolymer was reacted with 90 grams of isopropylidenebisphenol and 1.2 grams of phosphorous acid at 190° C/10 mm. Hg for 2 hours. About 180 grams of the resulting syrup was transferred to an Atlantic 2CV Reactor and the reaction continued for 12 hours at 175° C. to give a rubbery gum.

100 Grams of the gum was compounded on a standard 2-roll rubber mill as follows:

| | | |
|---|---|---|
| Gum | 100 | Parts |
| Carbon black | 40 | |
| Stearic acid | 1 | |
| Calcium carbonate | 2.5 | |
| Zinc Oxide | 5 | |
| Sulfur | 1.5 | |
| 2-Mercaptobenzothiazole | 1.5 | |
| Tetramethylthiuram disulfide | 1.75 | |

The compounded gum was compression molded for 20 minutes at 320° F. The cured elastomer gave the following stress-strain properties:

| | |
|---|---|
| Hardness, Shore A | 71 |
| Modulus at 100%, psi | 625 |
| at 200%, psi | 1100 |
| Tensile Strength, psi | 1275 |
| Elongation, % | 270 |

This example illustrates a preferred embodiment of the invention.

EXAMPLE III

Following the procedure of Example I thiodiethanol (1120 grams, 10 moles), trimethylolpropane monoallylether (69.5 grams, 0.4 mole), 2.4 grams antioxidant (1), and 2.4 grams phosphorous acid were reacted to provide a copolymer having an OH number of 105, equivalent to a molecular weight of 1070.
(1) Santonox R - see note (1), Ex. I A 250 gram portion of the above copolymer, 28 grams of isopropylidenebisphenol and 1.67 grams of phosphorous acid were heated at 190° C. for 2 hours and about 200 grams of the resulting viscous syrup transferred to an Atlantic 2CV reactor and reacted further at 183°–190° C for 9½ hours. The rubbery gum obtained was compounded and vulcanized as described in Example 2. Properties of the elastomer were:

| | |
|---|---|
| Elongation, % | 175 |
| Modulus, psi at 100% | 600 |
| Tensile strength, psi | 1350 |
| Hardness, Shore A | 64 |
| Volume Swell, % (ASTM No. 3 oil) | 9.2 |
| Brittle point*, °C | −52 |

*duPont Thermomechanical Analyzer

EXAMPLE IV

Thiodiethanol (400 grams, e.28 moles) was polymerized in the presence of 0.4 grams (0.1%) of phosphorous acid by heating for 4–5 hours at 195° C, removing water as formed during the condensation. The resulting viscous syrup had a hydroxyl number of 163, equivalent to a molecular weight of 690.1.

A portion of the syrup (58.7 grams, 0.085 mole) was reacted with 20.4 grams, 0.089 mole, of isopropylidenebisphenol in the presence of 0.07 gram p-toluenesulfonic acid by heating at 220°–225° C/15 min. Hg for 2.5 hours, to give a rubbery gum.

35 grams of the gum was compounded on a small rubber mill with 0.35 gram stearic acid, 10.5 grams SAF carbon black, 2.3 grams of a resin consisting of 60% by weight of hexamethoxymethyl melamine and 40% hydrated silica, and 0.21 gram DL-camphorsulfonic acid. The compounded mixture was compression molded for 40 minutes at 250° F to give an elastomer with the following properties.

| | |
|---|---|
| Hardness, Shore A | 65 |
| Modulus at 100%, psi | 350 |
| Tensile, psi | 675 |
| Elongation, % | 180 |

Similar results were obtained when isopropylidenebisphenol was substituted by hydroquinone or resorcinol.

This example illustrates a preferred embodiment of the invention.

EXAMPLE V

Polythiodiethanol, 35 grams, having a molecular weight of about 9000 and containing about 1% by weight of phosphorous acid, was reacted with 15 grams of isopropylidenebisphenol by heating at 190°–200° C/10–15 min. Hg for 3 hours. A very tough rubbery gum was obtained.

EXAMPLE VI

A mixture of 280 grams, 2.5 moles, of thiodiethanol, 70 grams, 0.635 mole, of hydroquinone, and 1.4 grams of phosphorous acid was heated for 1 hour at 200° C., then for 1.5 hours at 190° C/25 inches vacuum. The resulting syrup, 53 grams, was heated for 1 hour at 200° C/10–15 min. Hg to yield a tough rubbery gum.

What is claimed:

1. A vulcanizable elastomer composition comprising a copolymer represented by the formula:

wherein $+ OG +$ comprises randomly distributed structural units of (I) and (II) taken alone or optionally with (III)

  (I)

  (II)

  (III)

wherein R represents the residue remaining on removal of two phenolic hydroxyl groups from a dihydric phenolic compound and R' represents the residue remaining on removal of two hydroxyl groups from an aliphatic diol; said copolymer characterized in that the ratio of structural units (I) to structural units (II), or optionally, to the total of structural units (II) and (III), is not less than 1:1, and further characterized in that up to about 10 mole percent, based on total number of structural units [OG] of structural units (III), in said copolymer, contain external unsaturation having an allylic hydrogen atom; and $x$ is an integer sufficient to provide a molecular weight of at least about 8000.

2. The composition according to claim 1 wherein the dihydric phenolic compound is a member selected from the group consisting of bisphenolic having the formula:

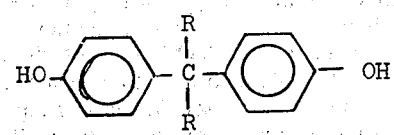

wherein R is the same or different and represents hydrogen, alkyl or taken together with the carbon atom combine to form a cycloalkylene bridge and polymers of said bisphenols with dibasic acids in which the terminal groups of said polymers are substantially phenolic residues.

3. The composition according to claim 2 wherein the bisphenol is isopropylidenebisphenol.

4. The composition according to claim 1 wherein the dihydric phenolic is of the formula:

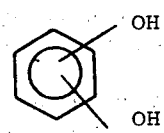

and polymers of said compounds with dibasic acids wherein the terminal groups of said polymers are substantially phenolic residues.

5. The composition according to claim 4 wherein the phenolic compound is hydroquinone.

6. The composition according to claim 4 wherein the phenolic compound is resorcinol.

7. The composition according to claim 1 wherein the copolymer consists only of randomly alternating structural units (I) and (II).

8. The composition according to claim 7 wherein the diphenolic compound is a bisphenol having the formula:

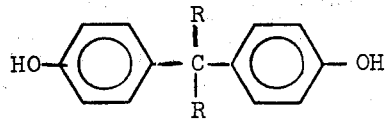

wherein R is the same or different and represents hydrogen, alkyl or taken together with the carbon atom combine to form a cycloalkylene bridge.

9. The composition according to claim 8 wherein the bisphenol is isopropylidenebisphenol.

10. The composition according to claim 1 wherein from about 1 to 10 mole percent, based on total structural units [OG], of the structural units (III) in the copolymer are derived from an aliphatic diol containing external unsaturation having an allylic hydrogen atom.

11. An elastomer prepared from the composition of claim 1.

12. An elastomer prepared from the composition of claim 7.

* * * * *